(12) United States Patent
Ono

(10) Patent No.: US 7,936,474 B2
(45) Date of Patent: May 3, 2011

(54) DATA TRANSMISSION SYSTEM AND APPARATUS FOR COPYING OR BACKUP

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 11/722,570

(22) PCT Filed: Feb. 22, 2006

(86) PCT No.: PCT/JP2006/303815
§ 371 (c)(1),
(2), (4) Date: Jun. 22, 2007

(87) PCT Pub. No.: WO2006/090885
PCT Pub. Date: Aug. 31, 2006

(65) Prior Publication Data
US 2010/0141982 A1      Jun. 10, 2010

(30) Foreign Application Priority Data
Feb. 22, 2005   (JP) ................................. 2005-046225

(51) Int. Cl.
*G06F 3/12* (2006.01)
*H04N 5/225* (2006.01)
*G06F 13/12* (2006.01)

(52) U.S. Cl. ........................ 358/1.15; 348/207.1; 710/62

(58) Field of Classification Search ................. 358/1.15; 348/207.1, 231.1, 231.99, 211.3; 710/62
See application file for complete search history.

(56) References Cited

U.S. PATENT DOCUMENTS

| | | | |
|---|---|---|---|
| 6,429,896 B1 * | 8/2002 | Aruga et al. | 348/231.99 |
| 7,113,218 B2 | 9/2006 | Battles et al. | 348/373 |
| 7,315,689 B2 | 1/2008 | Ono | 386/95 |
| 2002/0158970 A1 | 10/2002 | Takeshi | 348/211.3 |
| 2004/0070681 A1 | 4/2004 | Battles et al. | 348/333.01 |
| 2004/0189809 A1* | 9/2004 | Choi | 348/207.1 |

(Continued)

FOREIGN PATENT DOCUMENTS

DE   198 11 990   9/1999

(Continued)

OTHER PUBLICATIONS

Sep. 11, 2009 Japanese Official Action in Japanese Patent Appln. No. 2005-046225.

(Continued)

*Primary Examiner* — Benny Q Tieu
*Assistant Examiner* — Neil R McLean
(74) *Attorney, Agent, or Firm* — Fitzpatrick, Cella, Harper & Scinto

(57) ABSTRACT

When conditions for copying are satisfied while an image sensing apparatus is connected to a PC, copying is executed by only operating the copy button of the image sensing apparatus, and the progress of copying operation can be notified on the image sensing apparatus side. For this purpose, a program monitoring whether a digital video camera is connected is resident in a memory of the PC. When the digital video camera is connected to the PC, it is determined whether a writable optical disk is set, i.e., whether conditions for copying are satisfied. If the PC is ready for copying operation, the program notifies it to the digital video camera. Upon reception of this, the digital video camera turns on a copy button incorporating an LED. When this button is pressed, corresponding information is notified as response data to the PC, thereby starting copying operation.

9 Claims, 17 Drawing Sheets

U.S. PATENT DOCUMENTS

2006/0242340 A1 10/2006 Ono .................................. 710/62
2007/0097223 A1 5/2007 Ono .......................... 348/211.99

FOREIGN PATENT DOCUMENTS

| JP | 9-230495 | 9/1997 |
| JP | 2001-238156 | 8/2001 |
| JP | 2004-056396 | 2/2004 |

OTHER PUBLICATIONS

Jul. 10, 2006 Written Opinion and International Search Report in International Application No. PCT/JP2006/303815.

May 3, 2007 International Preliminary Report on Patentability in International Application No. PCT/JP2006/303815.

* cited by examiner

FIG. 3

| Bit<br>Byte | 7 | 6 | 5 | 4 | 3 | 2 | 1 | 0 |
|---|---|---|---|---|---|---|---|---|
| 0 | Operation Code | | | | | | | |
| 1 | LUN(Obsolete) | | | DPO(0) | FUA | Reserved | | RelAdr |
| 2 | MSB | | | | | | | |
| 3 | Logical Block Address | | | | | | | |
| 4 | | | | | | | | |
| 5 | | | | | | | | LSB |
| 6 | Reserved | | | | | | | |
| 7 | MSB | | | Transfer Length | | | | |
| 8 | | | | | | | | LSB |
| 9 | Vendor-Specific | | | Reserved | | NACA | Flag | Link |
| 10 | PaD | | | | | | | |
| 11 | | | | | | | | |

FIG. 7

| Bit<br>Ofst | 7 | 6 | 5 | 4 | 3 | 2 | 1 | 0 |
|---|---|---|---|---|---|---|---|---|
| 0 | Operation Code (0xFF) ~701 | | | | | | | |
| 1 | LUN(Obsolete) | | | Reserved ~702 | | | | |
| 2 | Code ~703 | | | | | | | |
| 3 | Status ~704 | | | | | | | |
| 4 | Allocation Length ~705 | | | | | | | |
| 5 | Reserved | | | | | | | |
| 6 | Reserved | | | | | | | |
| 7 | Reserved | | | | | | | |
| 8 | Reserved | | | | | | | |
| 9 | Reserved | | | | | | | |
| 10 | Reserved | | | | | | | |
| 11 | Reserved | | | | | | | |

FIG. 9

| 0 | READY |
|---|---|
| 1 | TRANSFER |
| 2 | TERMINATION PROCESSING |
| 3 | COMPLETION |
| 4 | STOP |
| 5 | ERROR |

FIG. 12

| 0 | READY |
|---|---|
| 1 | TRANSFER |
| 2 | BUSY |
| 3 | LOW BATTERY |
| 4 | MODE CHANGE |
| 5 | NO DISC |
| 6 | NO READABLE DISC |

DATA TRANSMISSION SYSTEM AND APPARATUS FOR COPYING OR BACKUP

TECHNICAL FIELD

The present invention relates to a copying or backup technique for data files stored/held in an image sensing apparatus such as a digital video camera.

BACKGROUND ART

According to a general usage pattern, image data recorded on an image sensing apparatus such as a digital camera or digital video camera are moved and saved in a large-capacity recording device (hard disk or the like) in a personal computer (to be referred to as a PC hereinafter) or saved in a random access medium like an optical disk such as a writable DVD or CD.

In this case, the user inserts a recording medium of the digital camera or digital video camera, e.g., a medium such as a compact flash memory, SD card, memory stick, or DVD, into the memory adapter of a PC, and transfers/records data onto a large-capacity recording device on the PC side. Alternatively, if the PC is not equipped with the above memory adapter, the PC is connected to the digital camera or digital video camera through a digital interface, e.g., a high-speed serial interface such as a USB or IEEE1394 interface, and data on the recording medium is read out on the PC side and transferred/recorded onto the large-capacity recording device. In either case, the user must designate and operate the transfer of data from the recording medium as a source to the large-capacity recording device by using an application on the PC.

FIG. 1 shows a state wherein a digital video camera 101 which uses a random access medium 102, e.g., a DVD media, as a recording medium is connected to a PC 103, to which a large-capacity, recording device 104 is connected, through a USB interface cable (obviously, both having USB interfaces).

The PC 103 operates as a USB host, and the digital video camera 101 operates as a USB device (slave). When the USB host is to acquire data from the USB device through the USB interface, communication is generally performed in accordance with standards like "Universal Serial Bus Still Image Capture Device Definition Revision 1.0 Jul. 11, 2000 (to be referred to as PTP hereinafter) or "Universal Serial Bus Mass Storage Class Bulk-Only Transport Revision 1.0 Sep. 31, 1999 (to be referred to as Mass Storage hereinafter).

In the case shown in FIG. 1, assume that communication is performed in conformity with the latter, i.e., Mass Storage.

Upon detecting the connection of the digital video camera 101 through a USB interface cable 105, the PC 103 acquires descriptor information from the digital video camera 101, and discriminates device information and a communication method, thereby recognizing that the digital video camera 101 is a mass storage class device. Thereafter, data are acquired in accordance with Mass Storage. In this case, the user can execute subsequent operation by operating an application on the PC 103.

FIG. 2 shows an example of the above application. This application is designed to read out data from an external device and record/save the data in an arbitrary recording medium. The user needs to activate a data save application 201 upon connecting the digital video camera 101 to the PC 103. In this application, a list of video data recorded on a recording medium of the digital video camera 101 is displayed in a display area 203, and a title bar (202) indicates that these data are located in the recording medium of the digital video camera drive. A title bar 204 indicates a recording device as a recording destination. In this state, the recording destination is a large-capacity recording device 104. When the user clicks a copy button 206 on the application, desired data in the recording medium of the digital video camera is copied to a designated folder in the large-capacity recording device 104. After the completion of the operation, the copied result is displayed in a display area 205. This example, however, is for the sake of simplicity. An actual application generally has specifications that allow the user to display video data as a recording source in thumbnail form or select data to be recorded, and also allow the user to select another recording device, e.g., an optical disk recording device such as a CD-RW or DVD-RW in place of the large-capacity recording device 104.

When the copy button 206 is actually clicked, the data save application 201 accesses the USB driver and mass storage driver of the PC 103 to read out data and start reception in conformity with Mass Storage. An operation sequence in Mass Storage will be briefly described below. The PC 103 as a USB mass storage host transmits Command Block Wrapper (CBW) to the digital video camera 101 as a mass storage device. When the digital video camera 101 as a mass storage device transmits Command Status Wrapper (CSW) in response to the received CBW, mutual communication is established. CBW and CSW only indicate a request and a response. Actual specific contents are designated by Command Block contained in CBW.

This Command Block is discriminated in accordance with the access interface of the device-side recording medium, such as:

"Advanced Technology Attachment Packet Interface for CD-ROMs.SFF-8020i",

"Reduced block Commands (RBC), T10/1240-D",

"Multi-Media Command Set2 (MMC-2)", or

"SCSI Primary Commands-2 (SPC-2), Revision 3 or later", and a command set to be used at the time of the establishment of communication with a USB mass storage host is determined by a code called a mass storage subclass.

In this case, Command Block is generated in accordance with an ATAPI (above-described "Multi-Media Command Set 2 (MMC02)" to be uniformly referred to as ATAPI hereinafter) command set (subclass 0x02). The PC 103 uses Command Block (READ(10)) for readout operation shown in FIG. 3 to read out data from the digital video camera 101, and reads out all data from the recording medium 102 of the digital video camera 101. Refer to the above ATAPI standards, for the detailed specifications of the READ(10) command in FIG. 3. A detailed description of this command will be omitted. The user need not be aware of these communication schemes, and can record/save data by operating an application 210.

In addition, a conventional technique of copying video data recorded by the digital video camera 101 onto a hard disk device connected to the video camera through IEEE 1394 has already been available (for example, Japanese Patent Laid-Open No. 2004-56396). This reference discloses an arrangement for selectively copying video data by remote control operation on the hard disk device side. An arrangement which allows data, having undergone copying to be erased is also disclosed.

In order to transfer and save data recorded on the recording medium 102 of the digital video camera 101 onto the large-capacity recording device 104 of the PC 103 by the above sequence, the user must operate the data save application 201. Although the above case has exemplified the simple application, complicated operation is required in practice. It is therefore cumbersome for a user who does not often use the PC 103 to operate the application.

A similar problem arises in patent reference 1. That is, the user needs to connect a video camera to a hard disk device and further operate copying operation sequentially by remote commander.

According to a general usage pattern of the digital video camera 101, after all video data or still image data obtained by photography are transferred/saved onto another large-capacity recording medium, the data recorded on the recording medium 102 of the digital video camera 101 are erased to prepare for new photographing operation. In consideration of these points, when data recorded on the recording medium 102 is to be transferred to another large-capacity recording medium, it is preferable to have as simple operability as possible and reliability that allows the user to visually recognize normal completion of transferring/recording/saving operation. That is, it is desirable for the user to simplify operation on the PC 103 as much as possible and perform control that can transfer/record/save all the data recorded on the recording medium 102 onto the large-capacity recording device 104 by only controlling the digital video camera (101).

DISCLOSURE OF INVENTION

The present invention has been made in consideration of such problems, and has as its object to provide a technique of allowing data files which an image sensing apparatus has to be copied or backed up onto a writable storage medium set in an information processing apparatus such as a PC by only connecting the image sensing apparatus to the information processing apparatus and inputting a predetermined instruction on the image sensing apparatus side.

In addition, in this case, there is provided a technique of allowing to check the timing at which an instruction to start copying is issued and the progress of copying operation on the image sensing apparatus side.

In order to solve this problem, for example, an information processing apparatus of the present invention has the following arrangement.

There is provided an information processing apparatus which includes communication means for communicating with an image sensing apparatus, acquires a data file stored/held in the image sensing apparatus, and writes the data file in a predetermined writable storage medium, characterized by comprising:

copying initialization means for transmitting a status command indicating that copying can be performed to the image sensing apparatus when a communicable state with the image sensing apparatus is established through the communication means and the writable storage medium is set; and copying intermediate processing means for transmitting a progress of copying as a status command every time a response command is received from the image sensing apparatus after the status command is transmitted by the copying initialization means, the copying intermediate processing means comprising copying means for, when the response command includes information indicating that a predetermined copy button which the image sensing means includes is pressed, regarding the image sensing apparatus as a mass storage device, reading out all data files in the mass storage device, and starting write of the data files in the writable storage medium, means for transmitting a status command indicating that transfer is being performed to the image sensing means with respect to a response command received during copying processing by the copying means, and means for transmitting a status command indicating completion of copying to the image sensing apparatus with respect to a response command received after completion of copying processing by the copying means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a view showing the data structure of an ATAPI READ(10) command;

FIG. 7 is a view showing the data structure of a command to be transferred from the PC to the digital video camera in this embodiment;

FIG. 9 is a view showing the types of commands to be transmitted from the PC to the digital camera in this embodiment;

FIG. 12 is a view showing the types of response data to be transmitted from the digital video camera to the PC in this embodiment;

BEST MODE FOR CARRYING OUT THE INVENTION

The embodiments of the present invention will be described in detail below with reference to the accompanying drawings.

Figure 5:
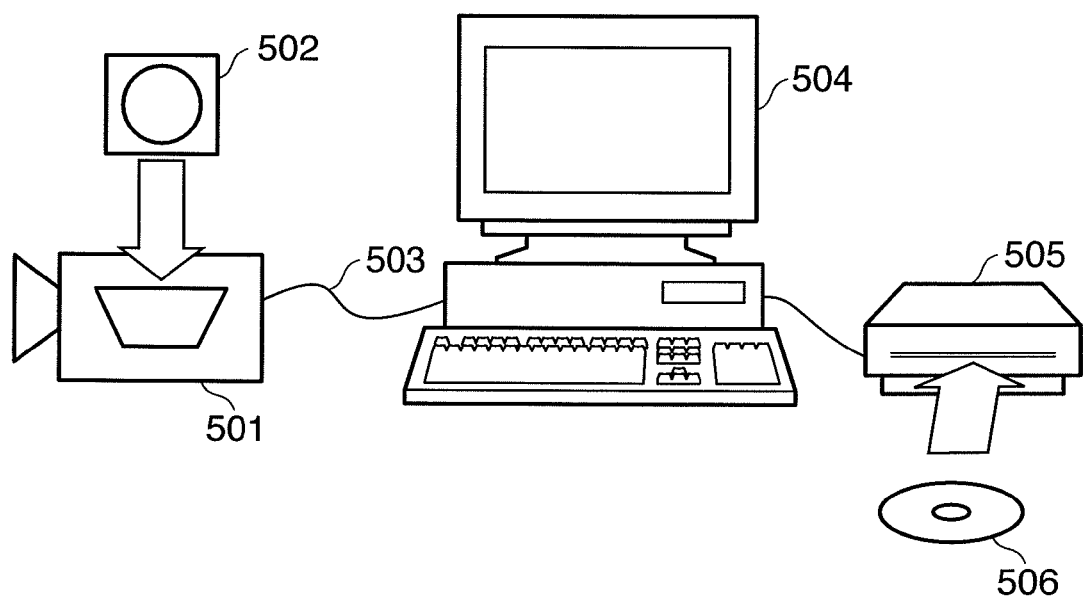
FIG. 5 is a view showing a state wherein a digital video camera is connected to a PC in this embodiment.

FIG. 5 shows an example of the arrangement of a data transmission system according to the present invention. In this example, a digital video camera 501 records data obtained by photography on an optical disk 502 such as a DVD-RAM (8 cm) as a recording medium. A PC 504 has a recording/playing back drive 505 for recording on a large-capacity optical disk 506 such as a large-capacity DVD-RAM (5 inch) as a recording medium. Connecting a USB cable 503 to the USB interfaces which the digital video camera 501 and the PC 504 respectively have makes it possible to realize data transmission. In this embodiment as well, Mass Storage is used as a USB transmission protocol. In this embodiment described below, it is an object to transfer and copy data recorded on the optical disk 502 onto the large-capacity optical disk 506.

Figure 1:
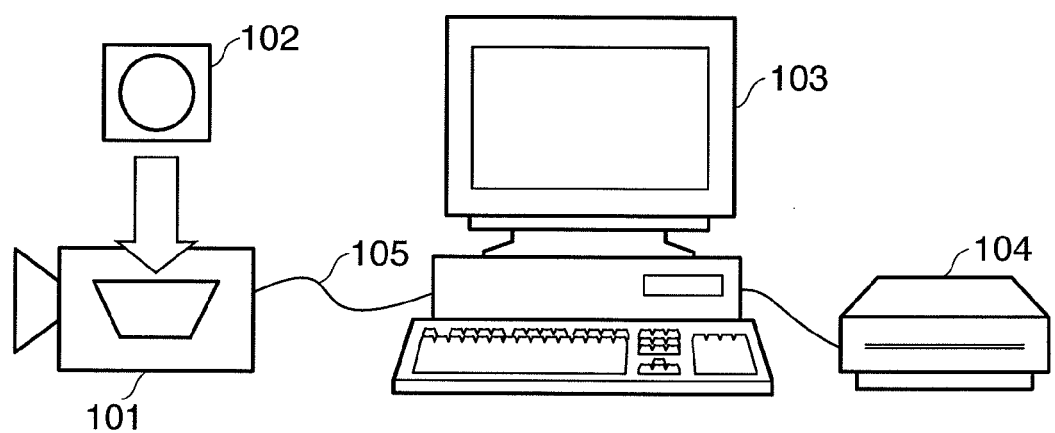
FIG. 1 is a view showing a state wherein a digital camera or a digital video camera is connected to a PC.
Figure 2:
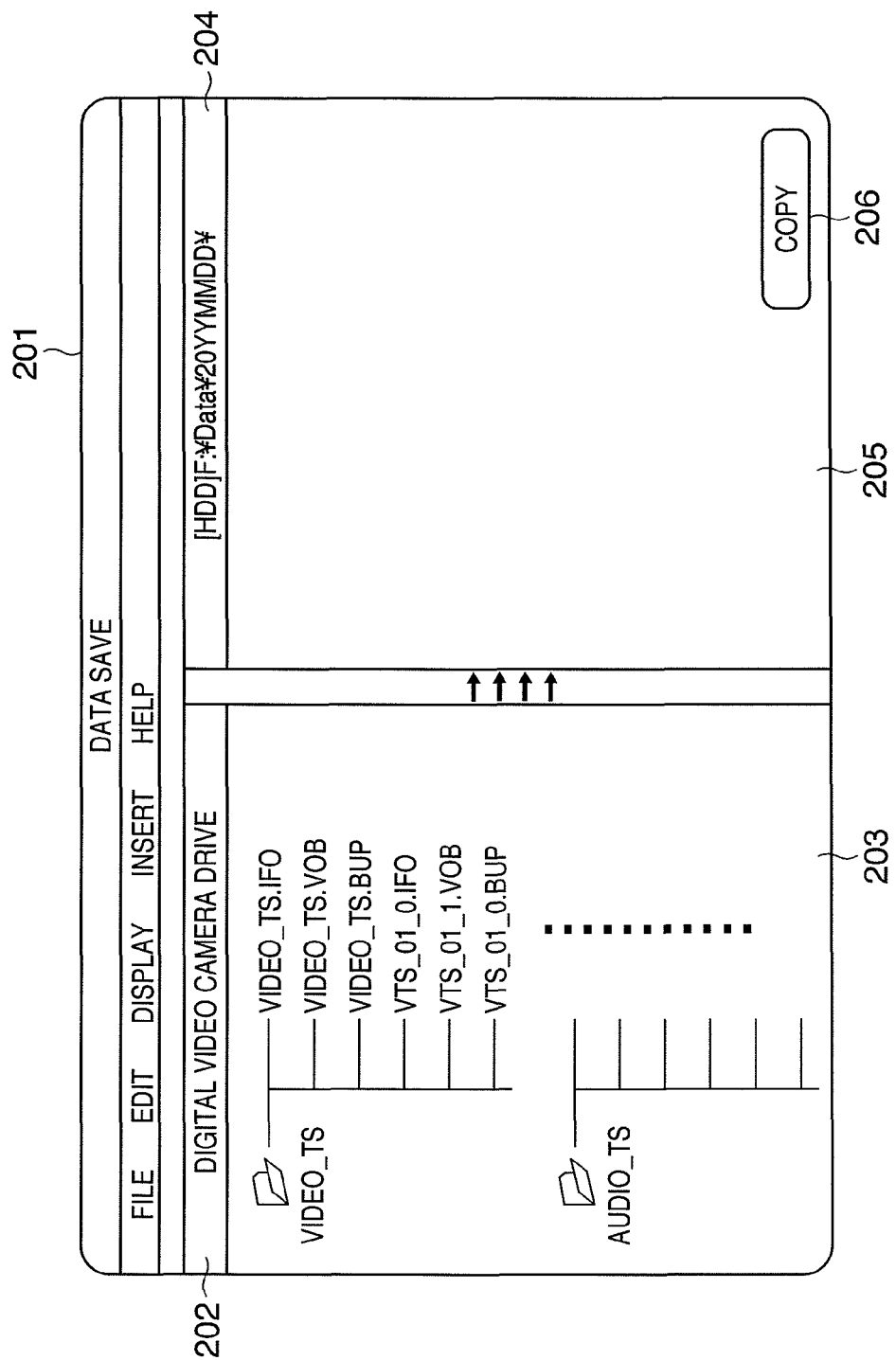
FIG. 2 is a view showing an example of a copy application executed on the PC.
Figure 4:
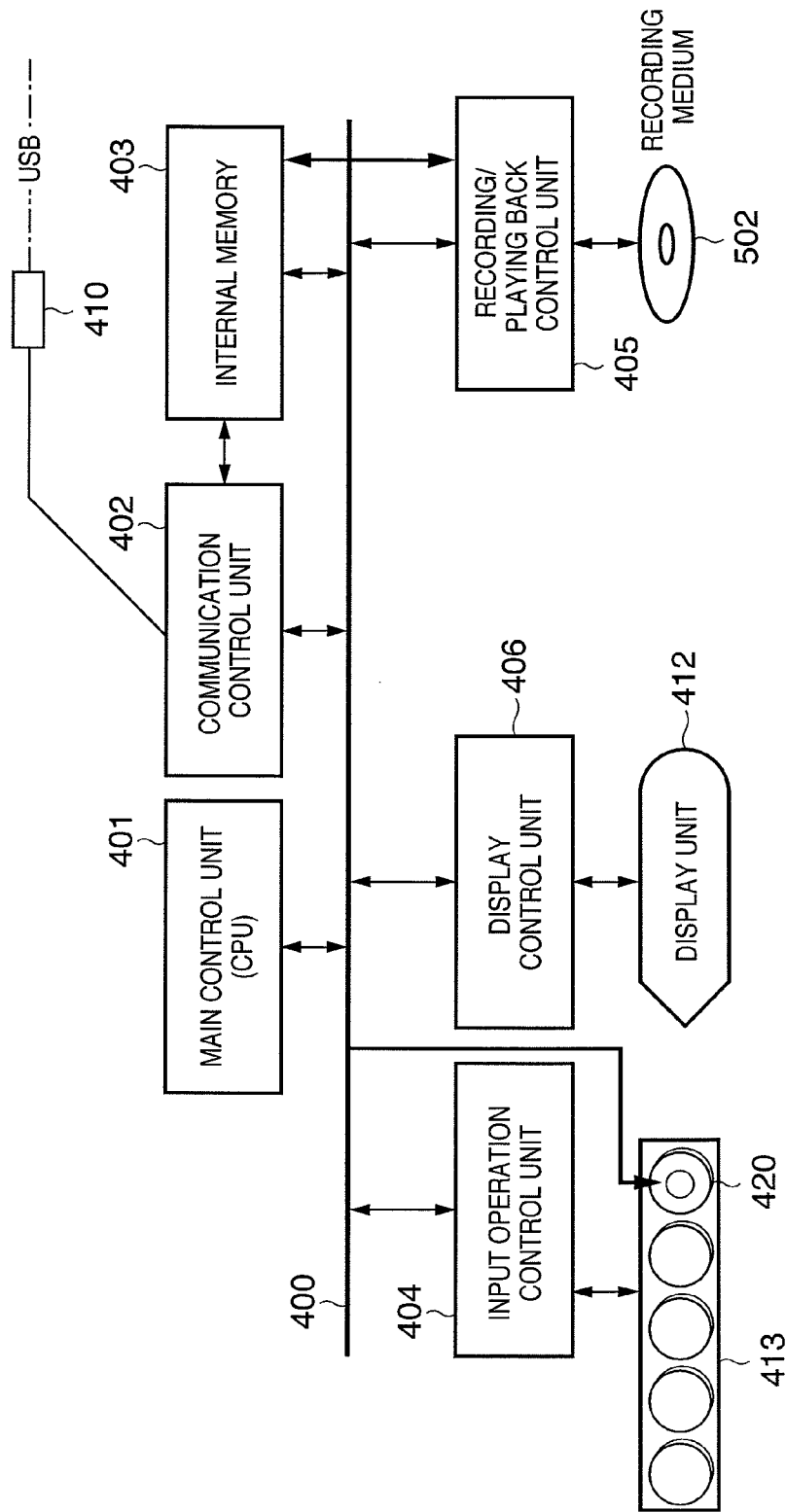
FIG. 4 is a block diagram showing the arrangement of the main part of a digital video camera in this embodiment.

FIG. 4 is a block diagram of the main part of an arrangement associated with the transfer of sensed data (image files) stored in the optical disk 502 in the digital video camera 501 according to this embodiment to the PC 504. Note that this camera, as a digital video camera, includes an image sensing arrangement and arrangements associated with AE control, AF control, and encoding, but an illustration thereof is omitted in FIG. 4. Each arrangement in FIG. 4 and its function will be described below.

A main control unit 401 is connected to each constituent element through a bus 400, and issues control instructions to each constituent element by software operating on the main control unit 401.

Upon being connected to an external device, i.e., the PC 504 in FIG. 5, through a USB device connector 410 and the USB cable 503, a communication control unit 402 performs communication control in accordance with the Mass Storage standards described above.

An input operation control unit 404 discriminates key information when the user performs input operation using input keys 413 of the digital video camera 501, and notifies software operating on the main control unit 401.

One of the input keys 413 is a button 420 in which an LED which can be turned on is embedded. The button 420 is used to issue an instruction to start copying operation when the digital video camera 501 is connected to the PC 504 through a USB cable and to inform the user of a communication state by driving/controlling LED lighting.

A display control unit 406 generates a video to be displayed on a display control unit 412 of the digital video camera 501 and controls its display.

A recording/playing back control unit 405 records and plays back data obtained by photography on or from the optical disk 502, and controls the transfer of the readout data to an internal memory 403. The readout data is transmitted to the outside through the communication control unit 402 or transferred to the display unit through the display control unit 412.

Figure 6:
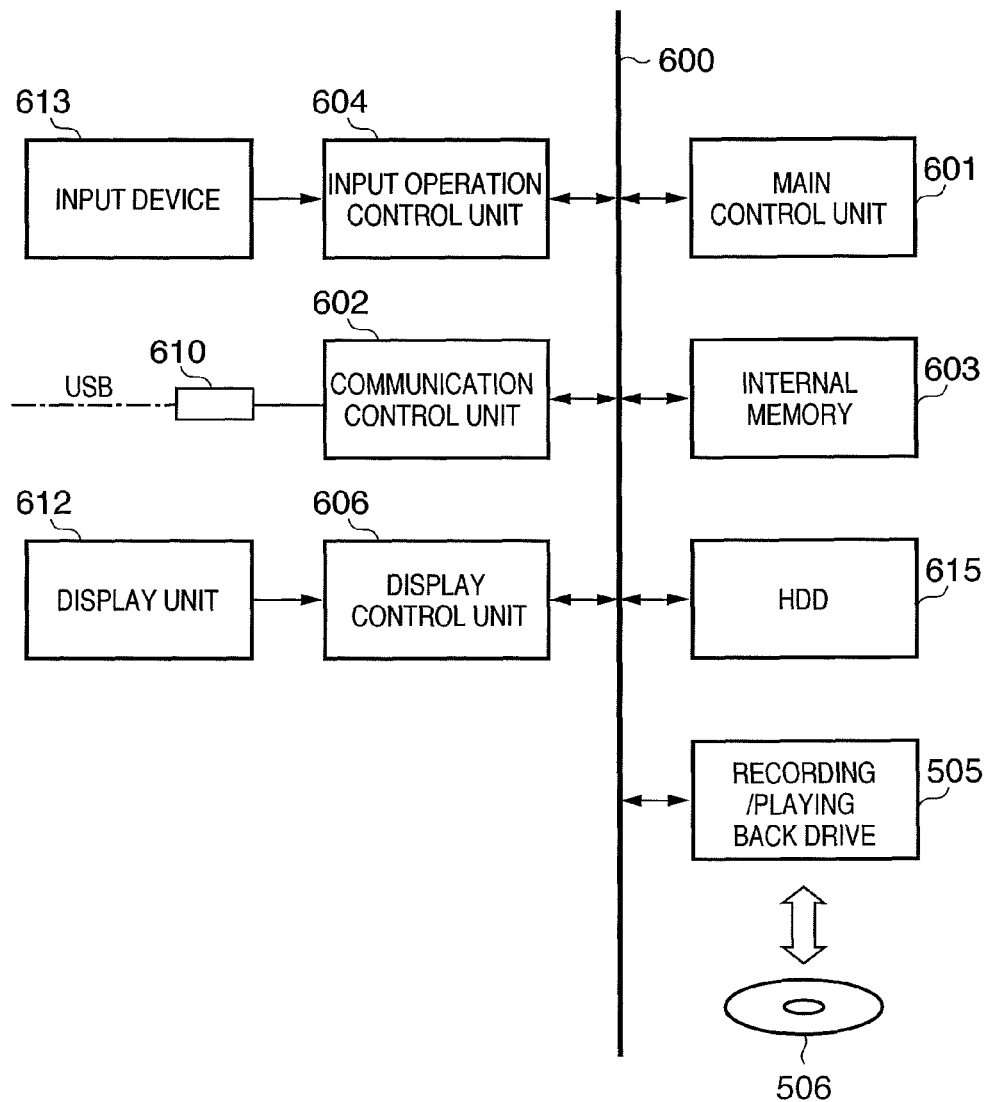
FIG. 6 is a block diagram showing the arrangement of the PC in this embodiment.

FIG. 6 is a block diagram of the main part of the arrangement of the PC 504. As shown in FIG. 6, the PC 504 includes a main control unit (comprising a CPU) 601 which controls the overall apparatus, an input operation control unit 604 which performs input operation from an input device 613 comprising a keyboard and a pointing device such as a mouse, a communication control unit 602 which has a USB host connector 610, an internal memory 603 into which an OS and various kinds of applications are loaded and which is used as a buffer area for writing in the optical disk 506, and a display control unit 606 which outputs video signals to a display unit 612 comprising a CRT, a liquid crystal display, or the like, and renders data in an internal video memory in accordance with a request from the main control unit 601. The PC 504 also includes a hard disk drive (HDD) 615 in which an OS and an application program for executing main processing in this embodiment are stored.

The arrangements of the digital video camera 501 and PC 504 in this embodiment have been described above. Processing in the embodiment will be described next.

<Explanation of Application Program in PC 504>

The application program stored in the HDD 615 in this embodiment is roughly comprised of three modules A to C as follows. The respective programs have the following functions:

Module A: a program for performing status communication with the digital video camera;

Module B: a program for performing reception of sensed image data from the digital video camera and write processing (copying processing) to the optical disk 506; and Module C: a program which is resident in the internal memory 403 when the OS is activated, and determines whether to start copying processing.

In this embodiment, the above three modules serve to automatically write (copy) all the data files (sensed image files) stored in the optical disk 502 of the digital video camera 501 to the optical disk 506 by being triggered by the operation of connecting the digital video camera 501 to the PC 504 through a USB cable and the insertion of the writable optical disk 506 in the recording/playing back drive 505.

The internal memory 603 is to be used by various kinds of application programs used by the user (e.g., a document editing program, mail program, and WWW browser program) other than the application program in this embodiment. When, therefore, the digital video camera 501 is not connected to the PC 504, the amount of memory consumed by the application in this embodiment is preferably small with respect to the internal memory 603. For this reason, only the module C for determining whether to activate the application is stored as a resident program in the internal memory 603 instead of the entire application program.

Note that for the application in this embodiment, the model name of the digital video camera is known. The USB interface is an interface designed as a hot plug and play interface. When the digital video camera 501 is connected to the USB host connector 610 through the USB cable 503, this interface establishes mass storage communication. This communication establishment sequence has already been described above. In this case, the OS recognizes the connected device and acquires its device name. The module C in this embodiment monitors the occurrence of an event that the device is connected to the USB host connector 610, and is executed when a USB device is connected. Processing in each of the modules A to C will be described below.

<Explanation of Module C (Resident Program)>

Figure 15:
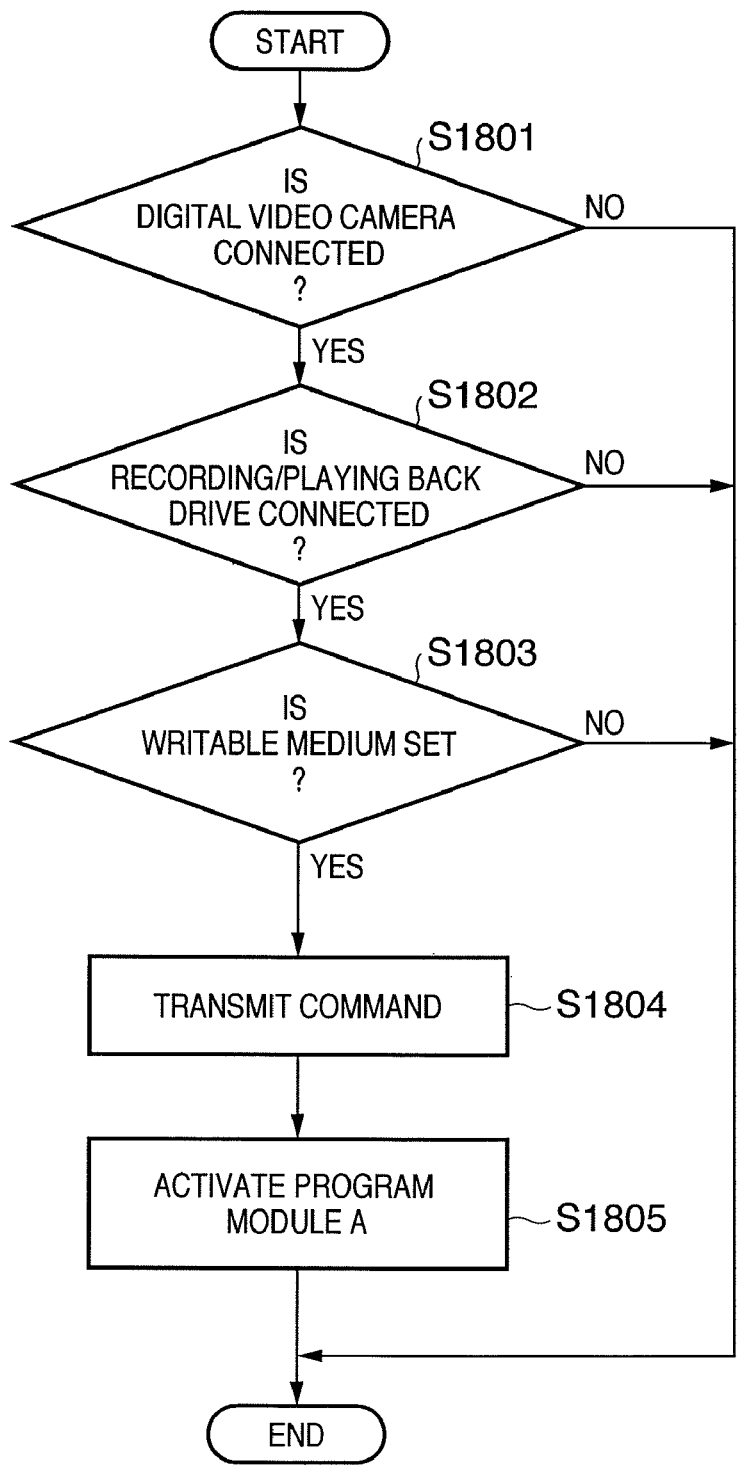
FIG. 15 is a flowchart showing the processing sequence of a program resident in the memory of the PC in this embodiment.

FIG. 15 is a flowchart showing a processing sequence by the module C in this embodiment. As described above, this processing is executed when some device is connected to the USB host connector 610.

First of all, in step S1801, it is determined whether the connected USB device is the known digital video camera 501. If NO in step S1801, this processing is terminated. If it is determined that the digital video camera 501 is connected, the flow advances to step S1802 to determine whether the recording/playing back drive 505 is connected. In step S1803, it is determined whether the writable optical disk 506 is set.

If it is determined that the recording/playing back drive 505 is connected and the optical disk 506 is set, the flow advances to step S1804 to transmit the command "READY(0)" (to be described later) through the USB host connector 610 to notify the digital video camera 501 that the PC 504 is ready for copying operation. In step S1805, the program module A is activated (read operation is executed from the HDD 615 to the internal memory 603).

If NO is determined in either step S1802 or step S1803, this processing is terminated.

The above description has exemplified the case wherein a USB device is connected to the USB host connector 610. If, however, the recording/playing back drive 505 is permanently connected to the PC 504 (the recording/playing back drive 505 is incorporated), the execution of the above processing may be started by being triggered when the optical disk 506 is set or when the optical disk 506 is set and the USB device is connected to the PC 504.

<Explanation of Module A>

As described above, the module A is executed when the digital video camera 501 and the PC 504 are connected to each other, and the writable optical disk 506 is set in the recording/playing back drive 505. When the module A is activated, the digital video camera 501 has already transmitted the command "READY (0)". Once the program module A is activated, the module is resident in the internal memory 603 during copying operation. This module is also executed when response data is received from the digital video camera 501.

A command transmitted to the digital video camera 501 in the processing by the module A has a data structure like that shown in FIG. 7. This command comprises 12-byte data conforming to the arrangement of an ATAPI command block. According to the ATAPI standards, a field 701 at the 0th byte of a data offset indicates the control information of this command block. However, since the functions of this embodiment are not defined by the ATAPI standards, a function is designated by 0xFF (0x indicates hexadecimal notation) indicating a command unique to the vendor.

A field 702 is configured to designate Logical Unit Number in the upper three bits in accordance with the ATAPI standards. This field designates 0 in this embodiment. A field 703 is configured to designate the detailed function of this command, and designates 0x01 in this embodiment.

A field 704 is the most important field in this embodiment. In the embodiment, this field indicates the status information of the PC 504. One of the values shown in FIG. 9 is set in this field. The respective values have the following meanings:

"READY (0)" is set if the PC 504 has received data and is ready for recording/saving operation;
"TRANSFER (1)" is set if data is being received;
"TERMINATION PROCESSING (2)" is set if the PC 504 has executed termination processing upon receiving data and recording/saving it;
"COMPLETION (3)" is set if the PC 504 has received data and completed recording/saving operation;
"STOP (4)" is set if processing is interrupted before data is received and recording/saving operation is complete; and
"ERROR (5)" is set if processing is interrupted due to an error, e.g., a write error, before data is received and recording/saving operation is complete.

As described above, when the module A is activated, since the PC 504 has already transmitted the command "READY (0)" to the digital video camera 501, a response (response data) is returned from the digital video camera 501. As will be described later, even during copying operation, response data is returned, and hence the module A executes processing. Processing by the module A will be described in consideration of this point with reference to the flowchart of FIG. 13.

First of all, in step S1301, a transmission time at which a command is transmitted next is set in accordance with the value of the field (1102) of the received response data. When this transmission time is set, command transmission processing (FIG. 8) forming the module A is executed upon waiting for the time.

Figure 8:
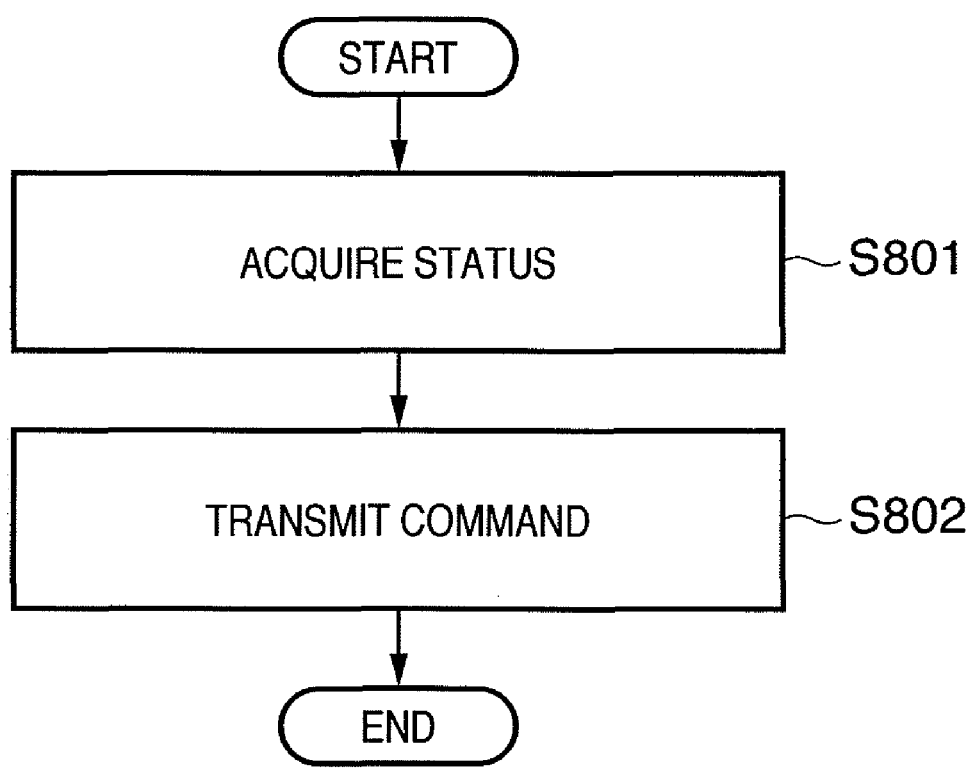
FIG. 8 is a flowchart showing command transmission processing in the PC in this embodiment.

As shown in FIG. 8, in this command transmission processing, a status is acquired in step S801, and the acquired status is transmitted as a command with the data structure shown in FIG. 7 to the digital video camera 501 in step S802. As a result, corresponding response data is returned from the digital video camera 501, and hence this processing is executed every time such response data is received.

Figure 11:
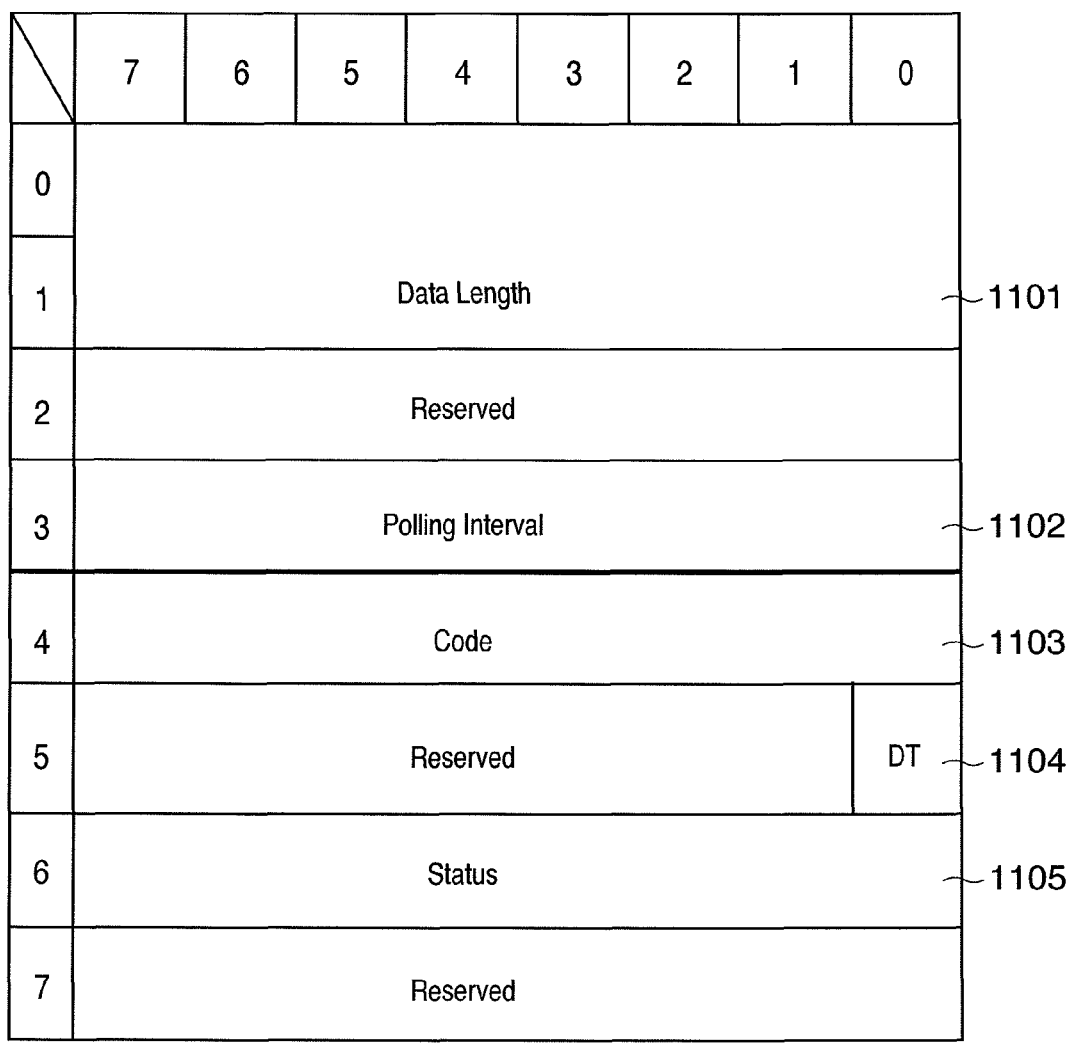
FIG. 11 is a view showing the data structure of response data generated on the digital video camera side in this embodiment.

Referring back to FIG. 13, when the processing in step S1301 is performed, i.e., an activation timing is set for command transmission, the flow advances to step S1302 to check a field of the response data (a field 1105 in FIG. 11 to be described later). If "READY (0)" is set, it is determined that the digital video camera 501 is ready for the transmission of sensed image data, and the flow shifts to step S1303.

In step S1303, a field of the response data (a field 1104 in FIG. 11 to be described later) is checked to determine whether "1" is set. Although not described in detail, "1" is set in this field when the button for issuing an instruction to start copying in the digital video camera 501 is pressed. If "1" is set in the field 1104, the flow advances to step S1304 to activate the module B for reading out data recorded on the optical disk 502 of the digital video camera 501 and writing (copying) the data in the optical disk 506 (load the module from the HDD 615 into the internal memory 603 and execute it), thus terminating the processing.

If it is determined in step S1302 that a status other than "READY (0)" is set in the field 1105 of the response data, the flow advances to step S1305 to determine whether the module B is activated. If the module B is activated, the corresponding status is notified to the module B in step S106. This processing is then terminated.

Although a description will be out of sequence, the OS operating on the PC 504 is a multi-task OS, and the modules A and B operate as different tasks.

<Explanation of Module B>

Processing by the module B will be described next with reference to the flowchart of FIG. 14.

In step S1401, a data acquisition command is transmitted to the digital video camera 501. In this case, the data acquisition command is configured as READ (10) command in FIG. 3 in accordance with the ATAPI standards, and is transmitted by a mass storage communication scheme.

In step S1402, the PC 504 receives a response from the digital video camera 501 through the communication control unit 602.

In step S1403, it is determined whether the received data is an error. If the data is an error, the flow shifts to step S1409 to display an error message on the display unit 612. The processing is then terminated. If the data is not an error, the flow shifts to step S1404.

In step S1404, the data is received, and an instruction to write the received data is given to the recording/playing back drive 505 to write the data in the optical disk 506.

If it is determined in step S1405 that a write error has occurred, the flow shifts to step S1409 to display an error message on the display unit 612. The processing is then terminated. If no error has occurred, the flow shifts to step S1406.

In step S1406, it is determined whether the input device 613 has received an instruction to cancel write operation from the user. If this instruction is received, the flow shifts to step S1409 to display an error message on the display unit 612. The processing is then terminated. Note that copying processing in this embodiment is apparently executed as background processing in the PC 504. However, when the module B is activated, the corresponding icon is displayed on a task bar which the OS has. When this icon is designated, a menu is displayed to allow the user to issue an instruction to cancel copying operation in the menu.

If it is determined in step S1406 that no cancel instruction is issued, the flow shifts to step S1407 to check, through the communication control unit 602, whether the digital video camera 501 is USB-connected to the PC 504. If it is detected that they are not connected, the flow shifts to step S1409 to display an error message on the display unit 612. The processing is then terminated. If they are connected, the flow shifts to step S1408.

In step S1408, it is checked whether a stop request is received from the software module A. If a stop request is received, the flow shifts to step S1409 to display an error message on the display unit 612. The processing is then terminated.

In this embodiment, notification from the software module A to the software module B is performed with a state flag ensured on the internal memory 603. Assume that the values which the state flag in this case can take conform to those in FIG. 12, and that when "LOW BATTERY" (3), "MODE CHANGE" (4), "NO DISC" (5), or "NO READABLE DISC" (6) is set, a cancellation request is issued. If not cancellation request is issued, the flow shifts to step S1410.

In step S1410, it is determined whether all the data recorded on the optical disk 502 of the digital video camera 501 have been read out. In this determination, since a recording capacity can be discriminated in mass storage communication, the corresponding information is used. If not all the data have been acquired, the flow shifts to step S1401 to continue the processing.

If it is determined in step S1410 that all the data have been acquired, the flow advances to step S1411 to terminate not only the module B but also the module A (notify the OS of the termination of the modules A and B and release these programs from the internal memory 603).

Figure 14:
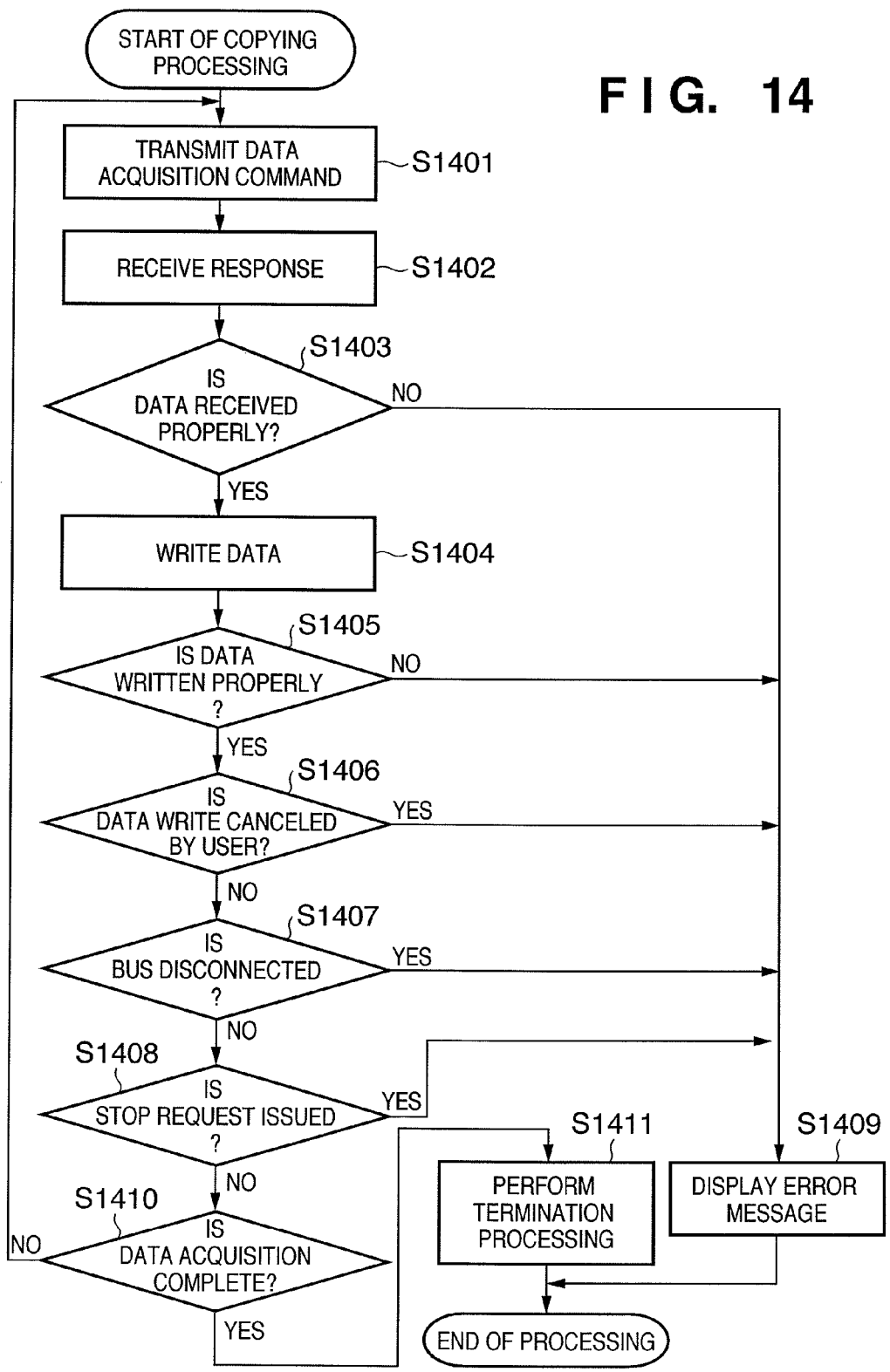
FIG. 14 is a flowchart showing copying processing in the PC in this embodiment.

Note that the software module B notifies the module A of information in accordance with a state during the execution of the flow in FIG. 14. Notification from the software module B to the software module A is performed with the state flags arranged on the internal memory 603 in the same manner as described above. The values which this flag can take conform to the values in FIG. 9. During copying operation as well, therefore, the processing shown in FIG. 8 is executed.

Figure 16:
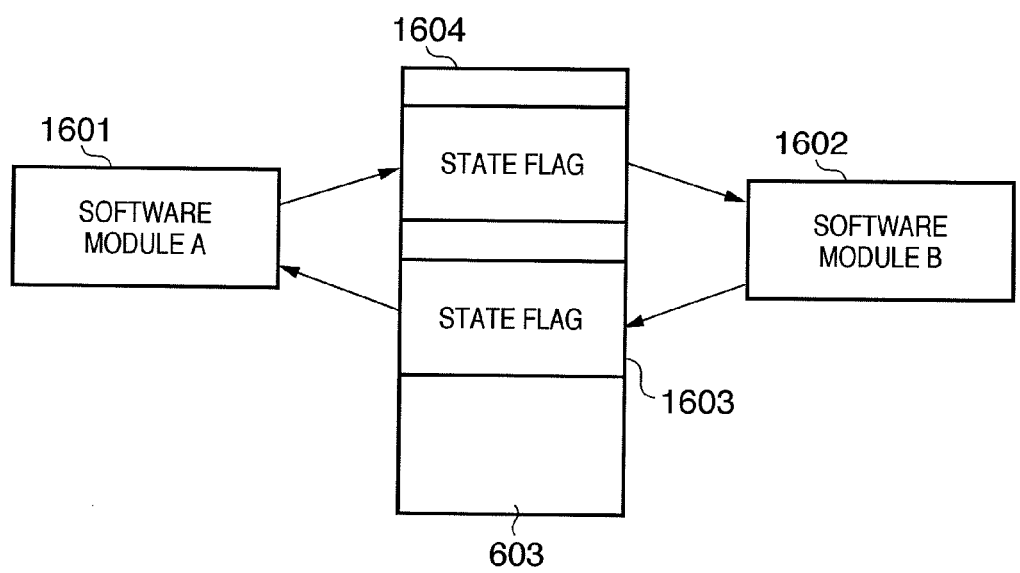
FIG. 16 is a view showing the principle of communication between software modules A and B executed in the PC in this embodiment.

FIG. 16 shows a state wherein the software module A and the software module B communicate with each other through the state flags arranged on the internal memory 603.

Notification from a software module A 1601 to a software module B 1602 is performed through a state flag 1604 ensured in the internal memory 603. Notification from the software module B 1602 to the software module A 1601 is performed through a state flag 1603.

The timing at which notification is performed from the software module B to the software module A is set as follows according to the flowchart of FIG. 14:

Step S1401: "Transfer" (1) is notified.

Step S1409: When the flow has shifted from step S1403 or S1405, "ERROR" (5) is notified, and when the flow has shifted from step S1406, "STOP" (4) is notified.

In the processing in step S801 in FIG. 8, a status is acquired from the state flag 1603 and transmitted to the digital video camera 501.

The above description is about the application program (modules A, B, and C) in the PC 504 in this embodiment.

<Explanation of Processing in Digital Video Camera 501>

Processing in the digital video camera 501 in this embodiment will be described next.

When the digital video camera 501 in this embodiment is connected to a PC, the camera makes a transition to a mass storage class device, like a digital video camera equipped with a general USB interface. The application program in this embodiment which operates on the PC reads all files from the device and writes them in the optical disk 506 by using a mass storage class protocol.

Figure 10:
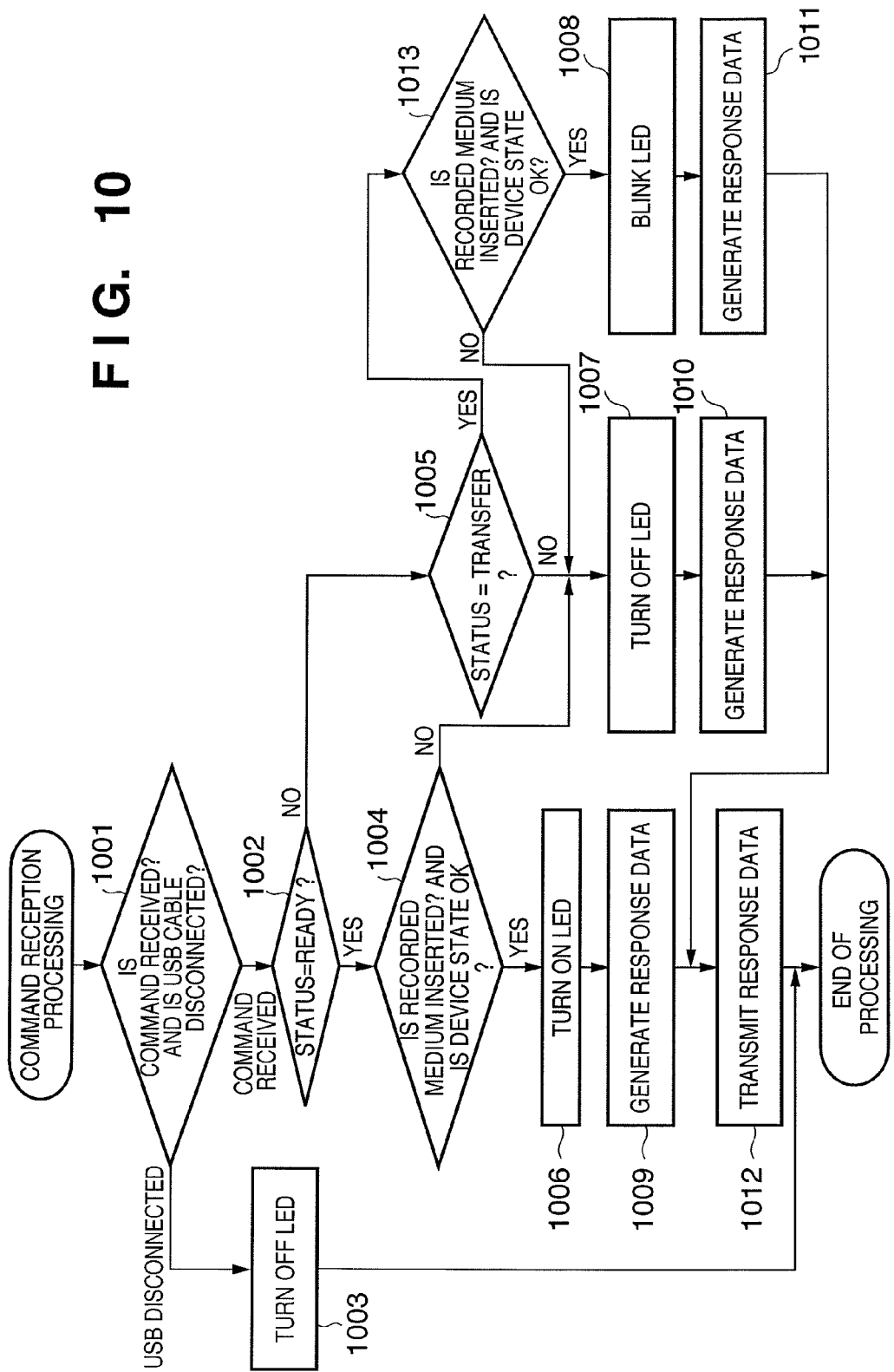
FIG. 10 is a flowchart showing a processing sequence in the digital video camera in this embodiment.

The flowchart shown in FIG. 10 is for the processing in which the main control unit 401 responds to notification from the communication control unit 402 while the digital video camera 501 is connected to the PC 504 through the USB cable 503 and communication is established.

In step S1001, the main control unit 401 determines whether a command is received from the PC 504 through the communication control unit 402 or whether the USB cable is disconnected (for example, the USB cable has come off the connector). If it is determined that the USB cable is disconnected, the flow advances to step S1003 to turn off the LED of the button 420.

If it is determined that a command is received, the main control unit 401 discriminates the command. If it is determined that this command is the command in FIG. 7, the flow shifts to step S1002. If another command is discriminated, processing corresponding to the command is executed. In this embodiment, a description of command processing other than that described above will be omitted for the sake of simplicity.

If it is determined in step S1002 that the value of the Status field 704 of the command in FIG. 7 is READY (0) indicating that the PC 504 is ready for recording the received data, the flow advances to step S1004. Otherwise, the flow advances to step S1005.

When the READY (0) command is received, it is equivalent to notifying that the PC 504 is ready for copying operation. It is therefore determined in step S1004 whether the optical disk 502 is set in the recording/playing back control unit 405. If the optical disk 502 is set in the recording/playing back control unit 405, it is determined whether video data obtained by photography is recorded on the optical disk 502. In this case, it is also determined whether the power supply of the digital video camera 501 is in a proper state and a proper mode is set.

For example, the transfer band of a USB interface (USB ver2.0 High Speed mode) corresponds to 480 Mbps, which is very high. Inevitably, the optical disk 502 is rotated at a speed higher than that in general photographing operation to read out data, which are in turn transferred to the PC 504. If, therefore, the photography mode is set, no data can be copied to the PC 504. The above proper mode is a mode in which no access is made to the optical disk 502.

Assume that it is determined that the recorded optical disk 502 is inserted in the recording/playing back control unit 405, a low-voltage (low-battery) state is not set, and the set mode is proper. In this case, the flow advances to step S1006 to turn on the LED of the button 420 so as to notify the operator that copying operation can be started. In step S1009, response data corresponding to the command (FIG. 7) from the PC 504 is generated. The response data generated in this step has the 8-byte format shown in FIG. 11.

The structure of the response data in FIG. 11 will be described below.

A first 2-byte field 1101 is used to store a response data length, in which a length of eight bytes is set in this embodiment.

A field 1102 is used by the PC 504 to designate the time to the transmission of the next command per 100 ms. That is, if, for example, the value of the field 1102 is 1, the PC 504 sends the next command after the lapse of 100 ms.

A field 1103 is used to set the same value as that set in the field 703 of the command in FIG. 7. In this embodiment, 0x01 is designated.

DT in a field 1104 is a flag indicating whether the user has pressed the copy button 420 has been pressed in the digital video camera 501. If the button 420 is pressed, 1 is set in this field. Although the pressing of the button 420 is detected in the flow shown in FIG. 17, a description thereof will be made later.

The field 1105 indicates the status of the digital video camera 501 and takes one of the values shown in FIG. 12. The respective values have the following meanings:

"READY" (0) is set if the digital video camera 501 is ready for the transmission of data;
"TRANSFER" (1) is set if data is being transmitted;
"BUSY" (2) is set if the digital video camera 501 is executing another processing and cannot respond to a command request from the PC 504;
"LOW BATTERY" (3) is set if the battery voltage drops during transmission of data;
"MODE CHANGE" (4) is set if the mode of the digital video camera 501 is changed;
"NO DISC" (5) is set when the optical disk 502 is not inserted in the digital video camera 501; and
"NO READABLE DISC" (6) is set if the readable optical disk 502 is not inserted in the digital video camera 501.

Referring back to the flowchart of FIG. 10, "READY" (0) indicating that the digital video camera 501 is ready for the transmission of data is set in the field 1105 of the response data generated in step S1009. If "1" is set in DT of the field 1104 (the user presses the copy button 420) in the processing in FIG. 17 (to be described later), the corresponding information is generated together.

Figure 13:
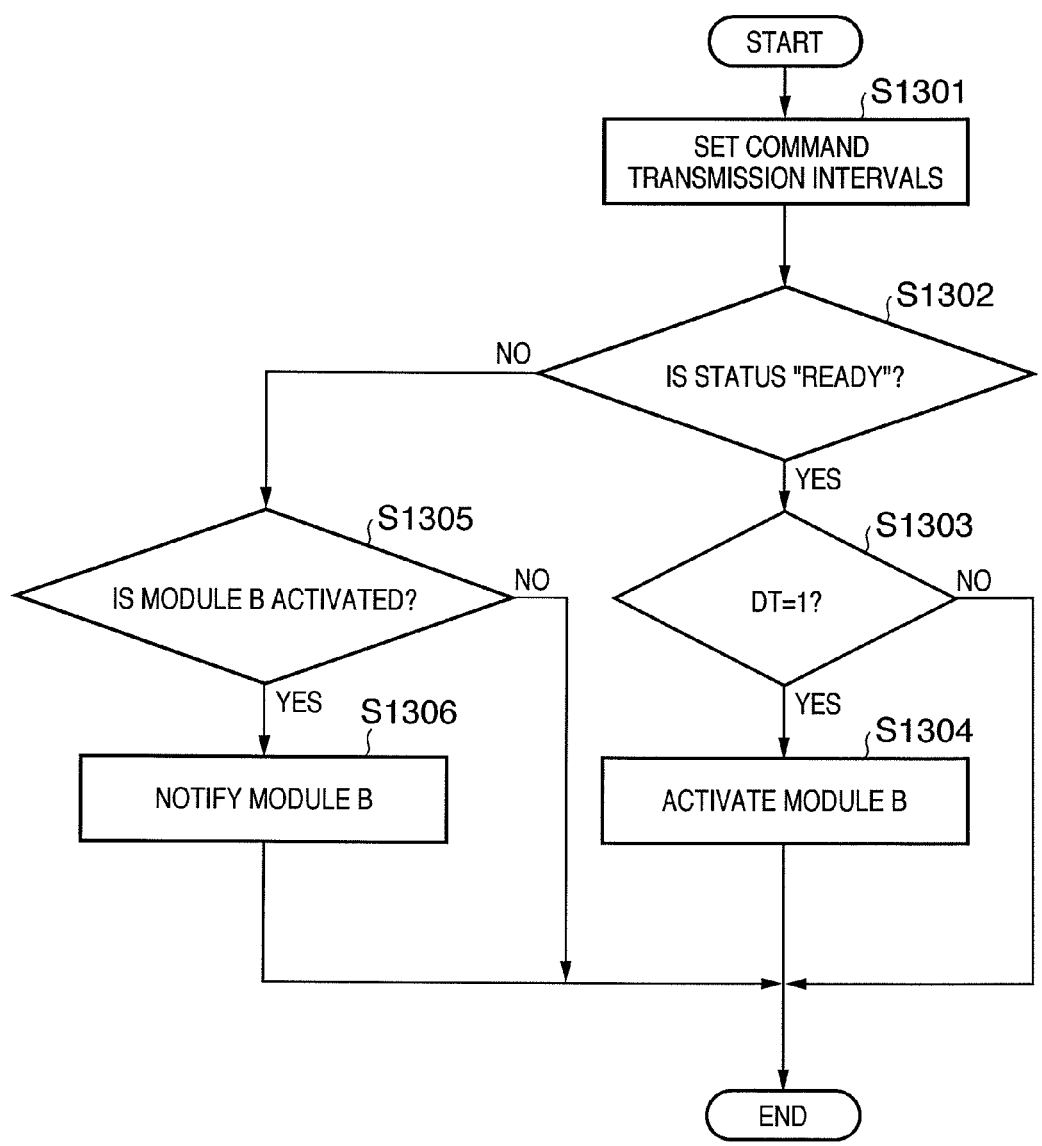
FIG. 13 is a flowchart showing response data reception processing in the PC in this embodiment.

If it is determined in step S1005 that the Status field 704 of the command from the PC 504 is "TRANSFER" (1), the flow advances to step S1013 to determine whether the optical disk 502 is normally inserted and whether the digital video camera 501 is not in a low-voltage state and is set in a correct mode. If these states are normal, the flow shifts to step S1008 to blink the LED of the button 420 so as to notify the operator that data is being transferred. Thereafter, in step S1011, response data is generated. At this time, "TRANSFER" (1) indicated in FIG. 13 is set in the Status field 1105. In addition, since data is being transferred, DT bit=1 is set in the field 1104.

If it is determined in step S1005 that "TRANSFER" (1) is not set in the Status field 704 of the received command, the flow advances to step S1007. In step S1007, the LED of the button 420 is turned off.

If the flow shifts from step S1004 to step S1010, since the digital video camera 501 is not ready for the transmission of data, NO DISC" (5) or "NO READABLE DISC" (6) is set in the field 1105 of the response data to be generated. Since data is not being transferred, DT bit=0 is set in the field 1104.

The response data generated above is transmitted to the PC 504 through the communication control unit 402 in step S1012.

Assume that when the above response data is transmitted, the response data is held in the internal memory 403 until the data is transmitted next. That is, the response data is generated by updating the previous response data.

Figure 17:
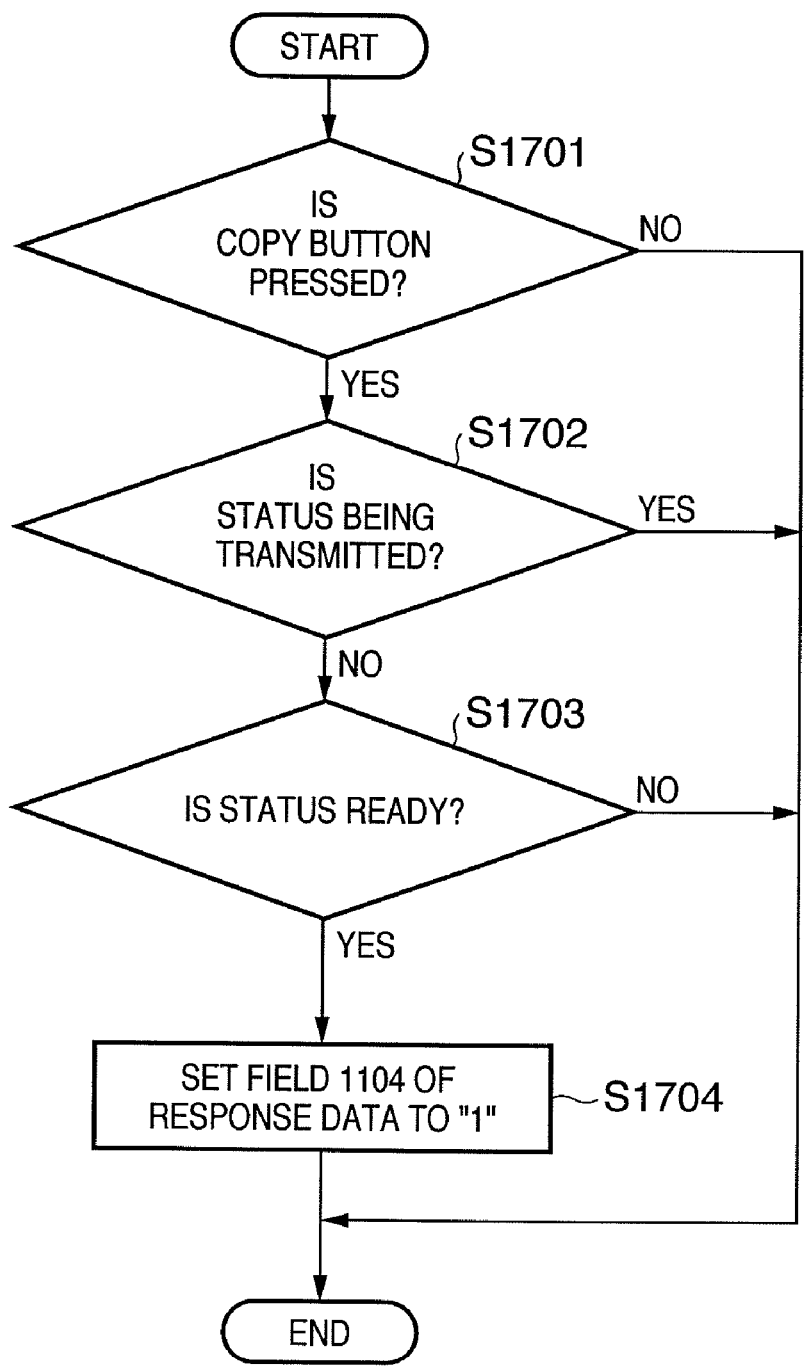
FIG. 17 is a flowchart showing a processing sequence to be performed when a button of the digital video camera is pressed in this embodiment.

Processing for detecting user input processing in the digital video camera 501 in this embodiment will be described next with reference to the flowchart of FIG. 17. This processing is executed asynchronously with the processing in FIG. 10. This processing is performed by software executed by the main control unit 401, but may be implemented by a hardware interrupt if a response is to be transmitted to the user at high speed.

When any button of the input keys 413 is pressed, this processing is started.

First of all, it is determined in step S1701 whether the pressed button is the copy button 420. If NO in step S1701, this processing is terminated. If the copy button 420 is pressed, the flow advances to step S1702 to check the status of the latest response data held in the internal memory 403 so as to determine whether "TRANSFER" is set. If "TRANSFER" is set, it indicates that image data has already been transferred. Therefore, this processing is terminated.

If it is determined that image data is not being transferred, the flow advances to step S1703 to determine whether the status of the response data is the "READY" state. If the "READY" state is determined, since it indicates that the digital video camera 501, the PC 504, and copying conditions are in proper states, and a copying instruction from the user is waited, the flow advances to step S1704 to set "1" in the DT of the field 1104 of the response data in the internal memory 403.

As a result, in the processing in FIG. 10 described above, if a command is received from the PC 504, response data in which the DT of the field 1104 is set to "1" in step S1009 in FIG. 10 is generated. This makes it possible to notify the PC that a copying instruction has been issued.

Note that the acquisition of an image data file in the digital video camera 501 from the PC 504 is performed by using the digital video camera in this embodiment as a mass storage as described above, and hence is performed in another task. In mass storage class transmission, when viewed from the PC 504, data is read out from the digital video camera 501 as an external storage device. Since this device is equivalent to a USB-connected external storage device, a description thereof will be omitted.

It should be noted that when the PC is to acquire files from an external storage device, the PC performs read processing by designating files one by one, and hence the external storage device cannot determine whether all the data which it holds are transferred. This applies to the digital video camera 501. In consideration of this point, according to this embodiment, almost all statuses including statuses indicating whether data is being acquired (transferred) and whether transfer is complete are generated on the PC 504 side and are notified to the digital video camera 501 so as to be used for control on the lighting of the copy button 420. When viewed from the user, therefore, it looks as if the digital video camera 501 behaved to autonomously transfer image files to the PC 504.

The embodiment has been described above and is summarized as follows:

1). When the digital video camera 501 is connected to the PC 504 through the USB cable 503 and the optical disk 506 as a writable recording medium is set in the PC 504, the PC 504 issues a READY command indicating that it is ready for copying to the digital video camera 501. Subsequently, the PC 504 returns a status with respect to a response from the digital video camera 501.

2). Every time a command is received from the PC 504, the digital video camera 501 generates a response to the command, and notifies the PC 504 of it. When the digital video camera 501 receives a READY command from the PC 504, if the optical disk 502 as a recording medium in which image files are stored is set, the digital video camera 501 returns a READY response to the PC 504. Upon receiving the READY command from the PC 504, the LED of the button 420 is turned on to notify the user that copying is started when the button is pressed by the user.

3). When the copy button 420 of the digital video camera 501 is pressed while a READY command and a READY response are transmitted and received, the next response data is used to notify the PC 504 that the copy button 420 is pressed.

4). Upon checking response data and detecting that the copy button is pressed, the PC 504 starts copying. At this time, the PC 504 issues, to the digital video camera 501, a command indicating that data is being transferred.

5). Upon receiving this command, the digital video camera 501 blinks the LED of the copy button 420 to notify the user that an image file is being transferred. The digital video camera 501 also returns a response corresponding to the received command to the PC 504.

6). Upon receiving all data files and completely writing them in the optical disk 506, the PC 504 notifies the digital video camera 501 of a command indicating the completion of the operation.

7). Upon receiving this command, the digital video camera 501 turns off the copy button 420.

As described above, controlling the lighting of the LED of the copy button 420 in the digital video camera 501 in accordance with a status from the PC 504 makes it possible to allow the digital video camera 501 to behave as if to autonomously transfer image files to the PC 504 and notify it of the state during the transfer while the digital video camera 501 serves as a mass storage of the PC.

Note that when the digital video camera 501 has received a "completion" command from the PC 504, since it indicates that all files have been successfully copied, the optical disk 502 may be initialized. This initialization is preferably performed on the PC 504 side. That is, the digital video camera 501 is recognized as a mass storage class device by the PC 504, and hence can be handled as a general flexible disk. It therefore suffices to only execute a program for causing the PC 504 to initialize the storage medium of the digital video camera 501. This makes it possible to reduce the required memory which stores firmware on the digital video camera 501 side.

The embodiment has exemplified the case wherein the digital video camera 501 and the PC 504 are connected to each other through a USB interface. If, however, the digital video camera 501 is recognized as a mass storage class device and files can be read by using a mass storage device protocol, the embodiment may be applied to a case wherein the camera and the PC can be connected to each other through an IEEE 1394 interface or a network interface.

In this embodiment, the copy button 420 incorporates the LED. However, the LED and the button need not be integrated. Note, however, that they are preferably integrated in the above manner to inform the user of a specific button which the user should press when the camera is ready for copying operation.

As is also obvious from the description of the above embodiment, since a characteristic feature of processing by the PC 504 resides in the application program, the present invention obviously incorporates the application program itself. The application program in the PC 504 in this embodiment is bundled in a CDROM or the like attached to the digital video camera 501. By setting this CDROM (computer-readable storage medium) in the PC and copying or installing the program in the system, the application program in the above embodiment can be executed. Obviously, such a computer-readable storage medium is incorporated in the present invention.

As has been described above, according to the present invention, when conditions for copying are satisfied while an image sensing apparatus is connected to an information processing apparatus such as a PC, copying is started by only operating the copy button of the image sensing apparatus, and the progress of copying operation can be notified on the image sensing apparatus side.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-046225 filed on Feb. 22, 2005, which is hereby incorporated by reference herein its entirety.

The invention claimed is:

1. An information processing apparatus which includes (a) a communication unit for communicating with an image sensing device which has an instruction unit for issuing an instruction to start dubbing and a display unit for displaying a status of dubbing progress, and (b) a recording unit for recording data in a predetermined writable storage medium, whereby the apparatus acquires a data file held in the image sensing device via said communication unit and performs the dubbing processing by writing the received data file in the predetermined writable storage medium by controlling said recording unit, said apparatus comprising:

a detection unit for, when an connection with an external device via said communication unit is detected, establishing a mass storage communication according to a mass storage class protocol, and detecting a device name of the connected external device;

a determination unit for determining whether or not a writable storage medium has been set in said recording unit;

a dubbing initial stage processing unit for, if the device name detected by said detection unit indicates an image sensing device to be a subject for dubbing and said determination unit determines that a writable storage medium has been set in said recording unit, transmitting, to the image sensing device via said communication unit, a status command including data so that the display unit of the image sensing device indicates a status for prompting a user to issue an instruction to start dubbing using said instruction unit; and a dubbing midterm stage processing unit for, after said dubbing initial processing unit transmits the status command, whenever receiving a respond command from the image sensing device via said communication unit, transmitting a status command to the image sensing device so that the display unit of the image sensing device displays a status indicating the dubbing progress, wherein said dubbing midterm stage processing unit comprises:

(a) a dubbing unit for, if the respond command includes information indicating that the instruction unit has been operated, recognizing the image sensing device as a mass storage device and starting the dubbing process including a reading process of all of data files stored in the mass storage device and writing process of all of the read data files into the recording medium;

(b) a unit for transmitting, to the image sensing device via said communication unit, a status command including data indicating that data is being transmitted for each received respond command in the dubbing processing performed by said dubbing unit; and (c) a unit for transmitting, to the image sensing device via said communication unit, a status command including data indicating the dubbing process completion after the dubbing processing performed by said dubbing unit has been completed.

2. The apparatus according to claim 1, wherein said writable storage medium is an optical disk.

3. A method of controlling an information processing apparatus which includes (a) a communication unit for communicating with an image sensing device which has an instruction unit for issuing an instruction to start dubbing and a display unit for displaying a status of dubbing progress, and (b) a recording unit for recording data in a predetermined writable storage medium, whereby the apparatus acquires a data file held in the image sensing device via said communication unit and performs dubbing processing by writing the received data file in the predetermined writable storage medium by controlling said recording unit, said method comprising:

a detecting step of, when a connection with an external device via said communication unit is detected, establishing a mass storage communication according to a mass storage class protocol, and detecting a device name of the connected external device;

a determining step of determining whether or not a writable storage medium has been set in said recording unit;

a dubbing initial stage processing step of, if the device name detected in said detection step indicates an image sensing device to be a subject for dubbing and it is determined in said determining step that a writable storage medium has been set in said recording unit, transmitting, to the image sensing device via said communication unit, a status command including data so that the display unit of the image sensing device indicates a status for prompting a user to issue an instruction to start dubbing using said instruction unit; and a dubbing midterm stage processing step of, after the status command is transmitted in said dubbing initial processing step, whenever a respond command is received from the image sensing device via said communication unit, transmitting a status command to the image sensing device so that the display unit of the image sensing device displays a status indicating the dubbing progress, wherein said dubbing midterm stage processing step comprises:

(a) a dubbing step of, if the respond command includes information indicating that the instruction unit has been operated, recognizing the image sensing device as a mass storage device and starting the dubbing process including a reading process of all of data files stored in the mass storage device and writing process of all of the read data files into the recording medium;

(b) a step of transmitting, to the image sensing device via said communication unit, a status command including data indicating that data is being transmitted for each received respond command in the dubbing processing performed in said dubbing step; and (c) a step of transmitting, to the image sensing device via said communication unit, a status command including data indicating the dubbing process completion after the dubbing processing performed in said dubbing step has been completed.

4. A non-transitory computer-readable storage medium storing a computer program which causes a computer to function as an information processing apparatus, which includes (a) a communication unit for communicating with an image sensing device having an instruction unit for issuing an instruction to start dubbing and a display unit for displaying dubbing progress status, and (b) a recording unit for recording data in a predetermined writable storage medium, whereby the apparatus acquires a data file held in the image sensing device via said communication unit and performs dubbing processing by writing the acquired data file to the predetermined writable storage medium by controlling said recording unit, wherein said program causes the computer to function as an apparatus comprising:

(a) a detection unit for, when a connection with an external device via said communication unit is detected, establishing a mass storage communication according to a mass storage class protocol, and detecting a device name of the connected external device;

(b) a determination unit for determining whether or not a writable storage medium has been set in said recording unit;

(c) a dubbing initial stage processing unit for, if the device name detected by said detection unit indicates an image sensing device to be a target for dubbing and said determination unit determines that a writable storage medium has been set in said recording unit, transmitting, to the image sensing device via said communication unit, a status command including data so that the display unit of the image sensing device indicates a status for prompting a user to issue an instruction to start dubbing using said instruction unit; and (d) a dubbing midterm stage processing unit for, after said dubbing initial processing unit transmits the status command, whenever receiving a respond command from the image sensing device via said communication unit, transmitting a status command to the image sensing device so that the display unit of the image sensing device displays a status indicating the dubbing progress, wherein said dubbing midterm stage processing unit comprises:

(a) a dubbing unit for, when the respond command includes information indicating that the instruction unit has been operated, recognizing the image sensing device as a mass storage device and starting the dubbing process including a reading process of all of data files stored in the mass storage device and a writing process of all of the read data files into the recording medium;

(b) a unit for transmitting, to the image sensing device via said communication unit, a status command including data indicating that data is being transmitted for each received respond command in the dubbing processing performed by said dubbing unit; and (c) a unit for transmitting, to the image sensing device via said communication unit, a status command including data indicating the completion of said dubbing process after the dubbing processing performed by said dubbing unit has been completed.

5. An image sensing device having an image sensing unit, a storage unit for storing a data file obtained by image sensing, a communication unit for communicating with an external apparatus, an instruction unit for issuing an instruction to start dubbing data files stored in the storage unit, and a display unit for displaying progress of the dubbing, the device comprising:

a function shifting unit for, when connection with an external apparatus via said communication unit is detected, establishing a mass storage communication according to a mass storage class protocol, notifying a device name of the connected external apparatus and causing said storage unit to function as a mass storage class device for the connected external apparatus;

a response data transmitting unit for, after the storage unit has been shifted to the mass storage device by said function shifting unit, if a status command is received from the external apparatus via said communication unit, generating response data indicating the status of the device, and transmitting the response data to the external apparatus via said communication unit; and a display control unit for changing the display status of said display unit according to which the received status command indicates one of ready for dubbing, in dubbing or dubbing completion, wherein, when the instruction for starting of dubbing is made by said instruction unit, said response data transmitting unit generates response data indicating that said instruction unit has been instructed to start dubbing and transmits the response data to the external apparatus via said communication unit.

6. The image sensing device according to claim 5, further comprising an initialization unit for initializing said storage unit if a status command from the external apparatus indicates that dubbing is complete.

7. The image sensing device according to claim 5, further comprising:
   a low battery detection unit for detecting a low battery status; and
   a unit for, when a low battery status is detected by said low battery detection unit, including information indicating the low battery status in the response data.

8. A method of controlling an image sensing device having a image sensing unit, a storage unit for storing a data file obtained by image sensing, communication unit for communicating with an external apparatus, an instruction unit for issuing an instruction to start dubbing data files stored in the storage unit, and a display unit for displaying a progress of the dubbing, the method comprising:
   a function shifting step of, when a connection with an external apparatus via said communication unit is detected, establishing a mass storage communication according to a mass storage class protocol, providing notification of a device name of the connected external apparatus and causing said storage unit to function as a mass storage class device for the connected external apparatus;
   a response data transmitting step of, after the storage unit has been shifted to the mass storage device in said function shifting unit, if a status command is received from the external apparatus via said communication unit, generating response data indicating the status of the device, and transmitting the response data to the external apparatus via said communication unit; and
   a display control step of changing the displaying status of said display unit according to which the received status command indicates one of ready for dubbing, dubbing is in process or dubbing is complete,
   wherein, when the instruction for starting dubbing is issued by said instruction unit, response data indicating that said instruction unit has been issued is generated and the response data is transmitted to the external apparatus via said communication unit in said response data transmitting step.

9. A data transmission system comprising:
   an image sensing device having an image sensing unit, a storage unit for storing a data file obtained by image sensing, first communication unit for communicating with an external apparatus, an instruction unit for issuing an instruction to start dubbing data files stored in the storage unit, and a display unit for displaying dubbing progress; and an information apparatus which reads out data files stored in the storage unit of the image sensing device and performs dubbing of the read data files to a predetermined recording medium, wherein said information apparatus comprises:
   (a) a second communication unit for communicating with an external apparatus;
   (b) a recording unit for recording data in a predetermined writable storage medium;
   (c) a detection unit for, when an connection with an external device via said second communication unit is detected, establishing a mass storage communication according to a mass storage class protocol, and detecting a device name of the connected external device;
   (d) a determination unit for determining whether or not a writable storage medium has been set in said recording unit;
   (e) a dubbing initial stage processing unit for, if the device name detected by said detection unit indicates an image sensing device to be a subject for dubbing and said determination unit determines that a writable storage medium has been set in said recording unit, transmitting, to the image sensing device via said second communication unit, a status command including data so that the display unit of the image sensing device indicates a status for prompting a user to instruct to start dubbing using said instruction unit; and
   (f) a dubbing midterm stage processing unit for, after said dubbing initial processing unit transmits the status command, transmitting a status command to the image sensing device whenever a respond command is received from the image sensing device via said second communication unit so that the display unit of the image sensing device indicates a status indicating the dubbing progress, wherein said dubbing midterm stage processing unit comprises:
   (a) a dubbing unit for, if the respond command includes information indicating that the instruction unit has been operated, recognizing the image sensing device as a mass storage device and for starting the dubbing process including a reading process of all of data files stored in the mass storage device and a writing process of all of the read data files into the recording medium;
   (b) a unit for transmitting, to the image sensing device via said second communication unit, a status command including data indicating that data is being transmitted for each received respond command in the dubbing processing performed by said dubbing unit; and
   (c) a unit for transmitting, to the image sensing device via said second communication unit, a status command including data indicating the dubbing process completion after the dubbing processing performed by said dubbing unit has been completed, wherein said image sensing device further comprises:
   (a) a function shifting unit for, when connection with an external apparatus via said first communication unit is detected, establishing a mass storage communication according to a mass storage class protocol, providing notification of a device name of the connected external apparatus and causing said storage unit to function as a mass storage class device for the connected external apparatus;

(b) a response data transmitting unit for, after the storage unit has been shifted to the mass storage device by said function shifting unit, if a status command is received from the external apparatus via said first communication unit, generating response data indicating the status of the device, and transmitting the response data to the external apparatus via said communication unit; and (c) a display control unit for changing the displaying status of said display unit according to which the received status command indicates one of ready for dubbing, dubbing in progress or dubbing complete, and wherein, when the instruction for starting dubbing is issued by said instruction unit, said response data transmitting unit generates response data indicating that said instruction unit has issued said instruction and transmits the response data to the external apparatus via said first communication unit.

* * * * *